2,960,541
ALLENE CONDENSATION PRODUCTS WITH DIENES

Edward U. Elam and Robert H. Hasek, Kingsport, Tenn., assignors to Eastman Kodak Company, Rochester, N.Y., a corporation of New Jersey No Drawing. Filed July 21, 1958, Ser. No. 749,647

8 Claims. (Cl. 260—648)

This invention relates to the synthesis of cyclic compounds from allene and conjugated diolefins, and more particularly, to 6-methylenebicyclo [2.2.1] hept-2-ene.

The condensation of allene, $CH_2=C=CH_2$, with itself and certain olefinic compounds has been reported. The products, however, have invariably been cyclobutane derivatives. On thermal dimerization, for example, allene gives 1,2-dimethylenecyclobutane [Blomquist and Verdol, J. Am. Chem. Soc., 78, p. 109 (1956)], as illustrated by the reaction:

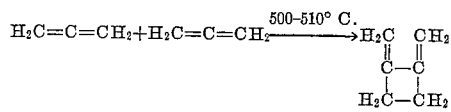

Allene has also been reported to react with tetrafluoroethylene to give cyclobutane derivatives [Coffman et al., J. Am. Chem. Soc., 71, p. 490 (1949)], and with phenylacetylene to give a cyclobutene derivative [Applequist and Roberts, J. Am. Chem. Soc., 78, p. 4021 (1956)], as illustrated by the reactions:

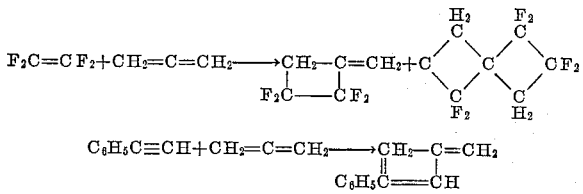

Another compound having a cumulative double bond system similar to that of allene is ketene. When ketene is condensed with a conjugated diolefin, for example, with cyclopentadiene the product is a bicyclic ketone and the reaction also involves the formation of a four-membered ring, as follows:

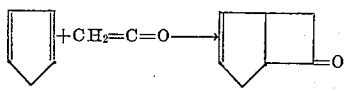

Accordingly, it would be expected from the prior art reactions that the condensation of allene with conjugated diolefins would likewise give products characterized by containing four-membered rings. However, we have now found that contrary to the aforementioned prior art teachings allene on condensation with certain linear or cyclic conjugated diolefins undergoes 1,4-condensation and gives instead of the expected cyclobutanes only methylenecyclohexenes or methylenebicycloheptenes, the reaction and products being illustrated by the following general reaction equation:

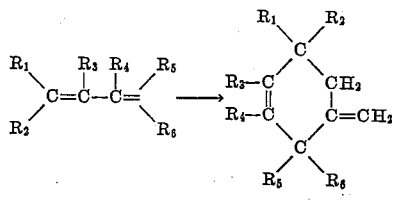

wherein $R_1$, $R_2$, $R_3$, $R_4$, $R_5$ and $R_6$ each represents hydrogen, an alkyl group of 1–4 carbon atoms, e.g. methyl, ethyl, propyl, isopropyl, butyl, etc. groups or a halogen atom such as chlorine or bromine, and wherein $R_1$ and $R_6$ together represent a hydrocarbon bridge member of 1–2 carbon atoms, such as a methylene, or an ethylene group, but more particularly, a —$C(R)_2$— group wherein R represents hydrogen, alkyl or halogen such as —$CH_2$—, —$CH(CH_3)$—, —$C(CH_3)_2$—, —CHCl—, —$CCl_2$—, etc., the bicycloheptenes being examples thereof. Since the above-defined products contain two olefinic double bonds, they react readily with carbon monoxide and hydrogen under oxo and hydroformylation conditions to give dialdehydes and diols, which may be converted to dibasic acids, diamines, and the like, for use in preparing synthetic fibers and molding plastics. Those containing a major proportion by weight of chlorine may be incorporated into vinyl plastics to impart valuable flame-resisting properties thereto. They are also useful as intermediates for the preparation of insecticides by chlorination thereof to a chlorine content depending on the product, for example, from about 60–80% by weight in chlorinated 6-methylenebicyclo [2.2.1] hept-2-ene and from about 70–80% by weight in chlorinated 6-methylene-1,2,3,4,7,7,-hexachlorobicyclo[2.2.1] hept-2-ene.

It is, accordingly, an object of the invention to provide a new class of useful cyclohexene and bicycloheptene derivatives. Another object is to provide a process for preparing the same. Other objects will become apparent hereinafter.

In accordance with the process of the invention, we condense allene with the conjugated diolefins by heating the reactants under pressure, and after the reaction is complete, separating the products which are viscous oils by fractional distillation under reduced pressure. The exact conditions to be used will depend primarily upon the reactivity of the conjugated diolefin used as diene, as well as on the tendency of this diene to condense with itself. Butadiene, for example, gives primarily its dimer, vinyl cyclohexene, under the conditions of our reaction. More active dienes, however, such as cyclopentadiene and hexachlorocyclopentadiene give satisfactory yields of condensation products after heating to 200° C. for six to twelve hours. In general, reaction temperatures of 50–250° C., preferably 150–250° C., and reaction times of one to twenty-four hours will be found satisfactory. Although the reaction could conceivably be carried out at atmospheric pressure by passing the reactants through a hot tube, conversions would be very low. It is preferable, therefore, to heat the reactant in an autoclave or sealed tube. The pressure developed under these conditions, will of course, depend upon the vapor pressure of the reactants. The molar ratio of diene to allene may be varied between very wide limits. In general, for preparing mono-adducts of allene with a diene, it is preferable that the ratio be one mole of diene to from one-half to ten or more moles of allene. By using excess diene, it is frequently possible to obtain adducts which contain two moles of diene per mole of allene. No catalyst is necessary for the reaction; inert solvents, such as alcohols or hydrocarbon solvents may be used if desired, but their use is a matter of convenience, rather than necessity. While separation of the product by distillation is preferred, it will be understood that other known separation methods can also be be used, for example, extraction methods. Suitable starting dienes include the various 1,3-butadienes such as 1-chlorobutadiene-1,3, 2-methylbutadiene-1,3, 2-chlorobutadiene-1,3, 1,2-dichlorobutadiene-1,3, 1,2-dichloro-3-methylbutadiene-1,3, 2,3-dimethylbutadiene-1,3, 2,3-dichlorobutadiene-1,3, 1,2,3,4-tetramethylbutadiene-1,3, 1,2,3-trichlorobutadiene-1,3, hexachlorobutadiene-1,3, etc., but preferably cyclopentadiene and its derivatives such as dicyclopentadiene, methylcyclopentadiene, 5,5-dimethylcyclopentadiene, 1-isopropyl-3-methylcyclopentadiene, 2,5,5-trimethylcyclopentadiene, 2-chlorocyclopentadiene, 1,2,3,4-tetrachlorocyclopentadiene, pentachlorocyclopentadiene, hexachlorocyclopentadiene, etc.

The following examples will serve to illustrate further the manner of practicing the invention.

*Example 1*

A mixture of approximately 20 g. (0.5 mole) of allene, 100 ml. of 90 dicyclopentadiene (equivalent to approximately 0.35 mole) and 1 g. of hydroquinone was placed in a chilled autoclave which was closed, then heated to 200° C. for ten hours. The crude product, which weighed 103.4 g., was distilled giving fractions boiling, at 45 mm., as follows: 36–41° C., 4.3 g., $n_D^{20}$ 1.4821; 45–52° C., 2.9 g. $n_D^{20}$ 1.4848; 52–83° C., 1 g.; and 83–90° C., 5.0 g. The pressure was then reduced and distillation continued at 16 mm., giving fractions as follows: to 106° C., 5.2 g.; 106–111° C., 11.7 g.; 111–121° C., 7.6 g.; 121–141° C., 6.4 g.; and 141–150° C., 8.6 g. The fractions boiling above 83° C. at 45 mm. all contained crystalline material which was identified as hydroquinone; it was filtered from the products before analysis. Analysis expressed as weight percent, calculated for $C_8H_{10}$: C, 90.5; H, 9.4; mol. wt., 106. Calcd. for $C_{13}H_{16}$: C, 90.5; H, 9.4; mol. wt., 172. Found: 36–41° C. (45 mm.) fraction, C, 89.91, H, 9.81, mol. wt., 107.6, 105.9; 106–111° C. (16 mm.) fraction, C, 90.04, H, 9.63, mol. wt., 166.1, 165.8.

Infrared and nuclear magnetic spectra showed that the 36–41° C. (45 mm.) fraction was 6-methylenebicyclo-[2.2.1]hept-2-ene and that the 106–111° C. (16 mm.) fraction was the product of 1 mole of allene with 2 moles of cyclopentadiene, these compounds being represented, respectively, by the following structural formulas:

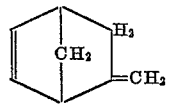

and

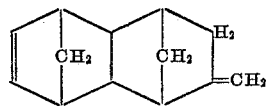

In place of the dicyclopentadiene in the above example, there may be substituted an equivalent amount of any of the mentioned cyclopentadienes coming within the general formula:

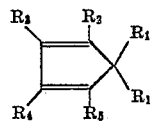

wherein $R_1$, $R_2$, $R_3$, $R_4$ and $R_5$ are as previously defined, to give generally similar products.

*Example 2*

A mixture of 10 ml. of allene and 110 g. of hexachlorocyclopentadiene was heated to 150° C. for 15 hours. The product, a brown, viscous oil, was distilled at 3 mm. giving fractions boiling from 80–85° C., $n_D^{20}$ 1.5648, 46.0 g. (unreacted hexachlorocyclopentadiene); 85–109° C., $n_D^{20}$ 1.5636, 16.5 g.; and 109–110° C., $n_D^{20}$ 1.5614, 21.6 g.; the residue weighed 10.2 g. Analysis expressed as weight percent, calculated for $C_8H_4Cl_6$: C, 30.6; H, 1.28. Found: (109–110° C./3 mm. fraction; C, 30.44, H, 1.31. Infrared and nuclear magnetic resonance spectra showed that the compound was 6-methylene-1,2,3,4,7,7-hexachlorobicyclo[2.2.1]hept-2-ene represented by the following structural formula:

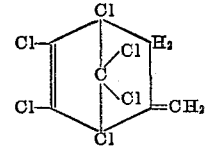

*Example 3*

This example illustrates the outstanding insecticidal properties of materials obtained by chlorinating the products of above Examples 1 and 2.

A. A solution of 31.3 g. (0.1 mole) of 6-methylene-1,2,3,4,7,7-hexachlorobicyclo[2.2.1]-hept-2-ene in 50 ml. of carbon tetrachloride was cooled in an ice bath. Chlorine was then passed in with stirring until 7.1 g. had been absorbed. The solvent was evaporated, giving a yellow oil which contained 74% chlorine. This product is designated "Compound I." The exact structure is not known.

B. Chlorine was passed into a solution of 21.2 g. (0.2 mole) of 6-methylenebicyclo[2.2.1]hept-2-ene in 100 ml. of carbon tetrachloride, in the presence of ultraviolet light, until about 40 g. of chlorine had been absorbed. The product, worked up as above, contained 65% chlorine. This compound is designated "Compound II." The exact structure is not known.

The contact insecticidal activity of the products obtained by the above procedure was tested against the German roach (*Blatella germanica*) and the milkweed bug (*Omelpeltus sociatus*). Mortality after 96 hours following a two minute immersion in a 0.25% aqueous suspension of the test compound was 100% in the case of both compounds, and for both insects.

Bloodstream insecticidal activity was tested against the American roach (*Periplantus americana*). Mortality after 96 hours following injections of 0.5 mg. of test compound per g. of insect body weight was 100%, for both male and female roaches, for both compounds.

The toxicity of the compound to the common housefly was tested by the Nelson drop test. The mortality after 24 hours following applications of 0.002 ml. of a 0.02% solution of the compound in acetone on the fly's body was 80% for Compound II and 85% for Compound I. These results compare extremely favorably with pyrethrin, a 0.04% solution of which gives only 40% kill under similar conditions.

Other similar compounds can be prepared from any of the mentioned suitable dienes by following the procedures of the above examples.

The invention has been described in detail with particular reference to preferred embodiments thereof, but it will be understood that variations and modifications can be effected within the spirit and scope of the invention as described hereinabove and as defined in the appended claims.

What we claim is:

1. A process for preparing a cyclic compound represented by the following general formula:

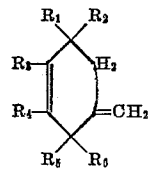

wherein $R_1$, $R_2$, $R_3$, $R_4$, $R_5$ and $R_6$ each represents a member selected from the group consisting of a hydrogen atom, an alkyl group of 1–4 carbon atoms and a chlorine atom, and wherein $R_1$ and $R_6$ together represent a —C(R)$_2$— bridge group wherein R stands for a member selected from the group consisting of a hydrogen atom, an alkyl group of 1–4 carbon atoms and a chlorine atom, which comprises heating allene with a diene selected from the group consisting of dicyclopentadiene and a compound represented by the general formula:

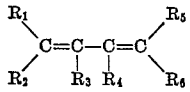

wherein $R_1$, $R_2$, $R_3$, $R_4$, $R_5$, $R_6$ and $R_1$ and $R_6$ together have the above defined meanings, at 50–250° C., and separating the said cyclic compound from the reaction mixture.

2. A process for preparing a cyclic compound represented by the following general formula:

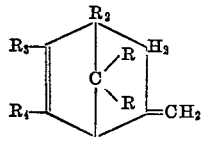

wherein R, $R_2$, $R_3$, $R_4$ and $R_5$ each represents a member selected from the group consisting of a hydrogen atom, an alkyl group of 1–4 carbon atoms and a chlorine atom, which comprises heating allene with a diene compound represented by the following general formula:

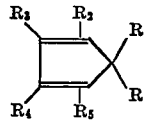

wherein R, $R_2$, $R_3$, $R_4$ and $R_5$ each have the above defined meanings, at 50–250° C., and separating the said cyclic compound from the reaction mixture.

3. A process for preparing 6-methylene-1,2,3,4,7,7-hexachlorobicyclo[2.2.1]hept-2-ene which comprises heating allene with hexachlorocyclopentadiene, at 50–250° C., and separating the said 6-methylene-1,2,3,4,7,7-hexachlorobicyclo[2.2.1]hept-2-ene from the reaction mixture.

4. A process for preparing 6-methylenebicyclo[2.2.1]-hept-2-ene which comprises heating allene with dicyclopentadiene, at 50–250° C., and separating the said 6-methylenebicyclo[2.2.1]hept-2-ene from the reaction mixture.

5. A chlorinated derivative of a compound represented by the following general formula:

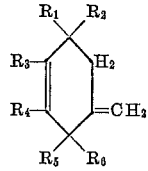

wherein $R_1$, $R_2$, $R_3$, $R_4$, $R_5$, and $R_6$ each represents a member selected from the group consisting of a hydrogen atom, an alkyl group of 1–4 carbon atoms and a chlorine atom, and wherein $R_1$ and $R_6$ together represents a —$C(R)_2$— bridge group wherein each R stands for a member selected from the group consisting of a hydrogen atom, an alkyl group of 1–4 carbon atoms and a chlorine atom.

6. A chlorinated derivative of a compound represented by the following general formula:

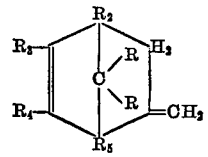

wherein R, $R_2$, $R_3$, $R_4$ and $R_5$ each represents a member selected from the group consisting of a hydrogen atom, an alkyl group of 1–4 carbon atoms and a chlorine atom.

7. 6 - methylene - 1,2,3,4,7,7 - hexachlorobicyclo-[2.2.1]hept-2-ene.

8. The chlorinated products of the compounds of claim 6 containing from 60–80% by weight of chlorine.

References Cited in the file of this patent
UNITED STATES PATENTS
2,886,608    Drysdale _____ May 12, 1959

Notice of Adverse Decision in Interference

In Interference No. 92,745 involving Patent No. 2,960,541, E. U. Elam and R. H. Hasek, ALLENE CONDENSATION PRODUCTS WITH DIENES, final judgment adverse to the patentees was rendered Dec. 10, 1964, as to claim 2.

[*Official Gazette February 23, 1965.*]